US005923114A

United States Patent [19]

Senni

[11] Patent Number: 5,923,114

[45] Date of Patent: Jul. 13, 1999

[54] BRUSHLESS SLIP RING USING ROLLING ELEMENTS AS ELECTRICAL CONDUCTORS

[76] Inventor: Alfred R. Senni, 26 Peachtree La., Burlington, N.J. 08016

[21] Appl. No.: 08/903,093

[22] Filed: Jul. 30, 1997

Related U.S. Application Data

[63] Continuation-in-part of application No. 08/681,970, Jul. 30, 1996, abandoned.

[51] Int. Cl.[6] .......................... H02K 13/00; H02K 13/02; H01R 39/12

[52] U.S. Cl. ............................ 310/232; 310/219; 439/12; 439/17; 439/19; 439/21; 439/27

[58] Field of Search .................................... 310/232, 248, 310/219; 439/17, 12, 19, 21, 27, 28, 20, 23, 24; 384/476, 491, 492

[56] References Cited

U.S. PATENT DOCUMENTS

| | | | |
|---|---|---|---|
| 1,176,554 | 3/1916 | Herzig | 439/17 |
| 1,649,276 | 11/1927 | Adam | 439/17 |
| 2,086,784 | 7/1937 | Taylor | 439/17 |
| 2,181,145 | 11/1939 | Mose | 439/17 |
| 2,502,252 | 3/1950 | Faile | 439/17 |
| 3,741,678 | 6/1973 | Romerhusen | 310/90 |
| 3,832,020 | 8/1974 | McCloskey | 439/17 |
| 4,006,954 | 2/1977 | Ikawa et al. | 339/8 R |
| 4,447,752 | 5/1984 | Boyce et al. | 310/232 |
| 4,592,605 | 6/1986 | Kapler | 339/8 R |

FOREIGN PATENT DOCUMENTS

| | | | |
|---|---|---|---|
| 1209187 | 1/1966 | Germany | 439/17 |

*Primary Examiner*—Nestor Ramirez
*Assistant Examiner*—Karl Imayoshi Eizo Tamai
*Attorney, Agent, or Firm*—Stuart M. Goldstein

[57] ABSTRACT

A brushless slip ring includes a housing, a plurality of annular spaces disposed in the housing and spaced apart along a common longitudinal axis, and a cageless assembly of electrically conductive spherical balls freely rotatably disposed in each of the spaces. Each of the spaces is formed between radially inner and outer electrically conductive surfaces of a rotor and stator, respectively, and a pair of axially spaced retainer rings. The spherical balls conduct electrical current between the outer and inner surfaces. The balls are rigid and harder than the inner and outer surfaces and are arranged in an annular row. The balls occupy substantially the entire circumference of the space and are freely circumferentially movable relative to one another within the space for making contact with one another.

23 Claims, 3 Drawing Sheets

BRUSHLESS SLIP RING USING ROLLING ELEMENTS AS ELECTRICAL CONDUCTORS

RELATED APPLICATIONS

This is a continuation-in-part of now-abandoned Ser. No. 08/681,970 filed. Jul. 30, 1996.

BACKGROUND OF THE INVENTION

The invention relates to a slip ring bushing for transmitting electrical energy between two relatively rotatable surfaces. The invention also relates to a method of inserting electrically conductive balls between two radially spaced annular surfaces.

Heretofore, in machines such as electric rotating machines, which utilize a power-driven rotor shaft (such as electric motors, generators, etc.), it has been conventional to transmit electrical energy between relatively rotatable surfaces by a slip ring apparatus employing a ring and a sliding brush. However, substantial frictional wear results, shortening the life of the apparatus.

It has also been proposed in U.S. Pat. No. 2,409,600 to replace brushes with electrically conductive rolling elements, such as spheres or cylinders which roll within an annular space formed between radially spaced outer and inner electrically conductive surfaces. The rolling elements are rotatably mounted in a cage, preferably formed of an electrically insulative material, which holds the rolling elements in circumferentially spaced apart relationship. As the inner ring rotates about a horizontal axis, the rolling elements roll against the outer and inner surfaces and conduct electrical current therebetween. In the case where spherically shaped rolling elements are used, the outer and inner surfaces are correspondingly shaped, and the outer surface is formed of half-sections that are bolted together to facilitate assembly of the parts. In addition, U.S. Pat. No. 4,592,605 discloses the use of caged rolling elements to transfer electrical current.

A shortcoming of the above-described structures is that it is virtually impossible to make all of the rolling elements of exactly the same diameter or to make the diameter exactly equal to the radial spacing between the inner and outer segments. Thus, it is possible that none of the rolling elements will actually contact both of the outer and inner surfaces. If the cage were formed of an electrically conductive material, an electrical transfer could take place through the cage, i.e., at a first interface between a rolling element touching one of the inner and outer conductive surfaces, then at a second interface between that rolling element and the cage, then at a third interface between the cage and a rolling element touching the other of the inner and outer conductive surfaces, and lastly at a fourth interface between the latter rolling element and the conductive surface. That travel path is relatively extensive and involves considerable electrical resistance, especially at the four interfaces where there may not be firm surface-to-surface contact, because in the absence of firm contact the electrical resistance at the interfaces is significantly increased. As a result, the current-carrying capacity of such a structure may be severely limited.

Another prior art proposal involves the provision of rolling elements in the form of circumferentially spaced, elastically flexible loops which are intended to flex under the forces imposed thereon by the electrically conductive surfaces. The loops thus roll between those outer and inner conductive surfaces while in a compressed state, and wherein rolling sleeves formed of an electrically conductive material are maintained in contact with circumferentially adjacent loops (see U.S. Pat. No. 4,372,633). However, the elastic force of the loops against the outer and inner surfaces increases the rate of wear.

SUMMARY OF THE INVENTION

The present invention relates to a brushless slip ring apparatus comprising a housing, and inner and outer members mounted in the housing for relative rotation about a longitudinal axis. The inner and outer members include radially spaced inner and outer electrically conductive surfaces forming an annular space therebetween. A cageless assembly of electrically conductive rolling elements such as balls or rollers conducts electrical current between the outer and inner surfaces. The rolling elements are rigid and arranged in an annular row. The rolling elements occupy a substantial portion of the circumference of the space and are freely circumferentially movable relative to one another for making electrically conductive contact with one another.

The present invention also relates to a method of assembling a plurality of electrically conductive spherical rotary elements into an annular space formed between radially spaced inner and outer electrically conductive surfaces. The annular space defines a longitudinal axis and is open in the direction of the axis. A radial spacing between the surfaces is slightly smaller than a diameter of at least some of the rotary elements. All of the rotary elements are harder than the surfaces. All of the rotary elements are inserted into the space in the axial direction until each of the rotary elements is in rolling contact with circumferentially adjacent ones of the rotary elements, and said some rotary elements are also in rolling contact with both of the inner and outer surfaces. Relative rotation is then effected between the outer and inner surfaces about the axis to cause said some rotary elements to roll along both of the inner and outer surfaces and form annular grooves therein.

BRIEF DESCRIPTION OF THE DRAWING

The objects and advantages of the invention will become apparent from the following detailed description of preferred embodiments thereof in connection with the accompanying drawings in which like numerals designate like elements and in which.

DETAILED DESCRIPTION OF PREFERRED EMBODEMENTS OF THE INVENTION

Figure 1:
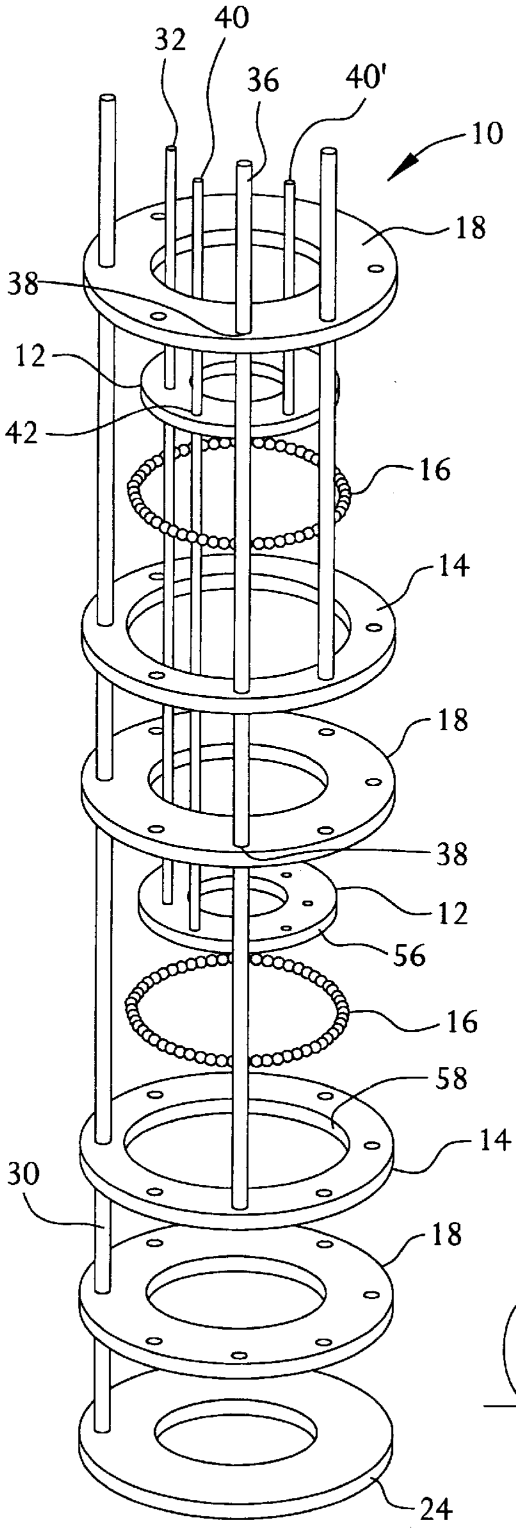
FIG. 1 is an exploded perspective view of a brushless slip ring according to the present invention.
Figure 2:
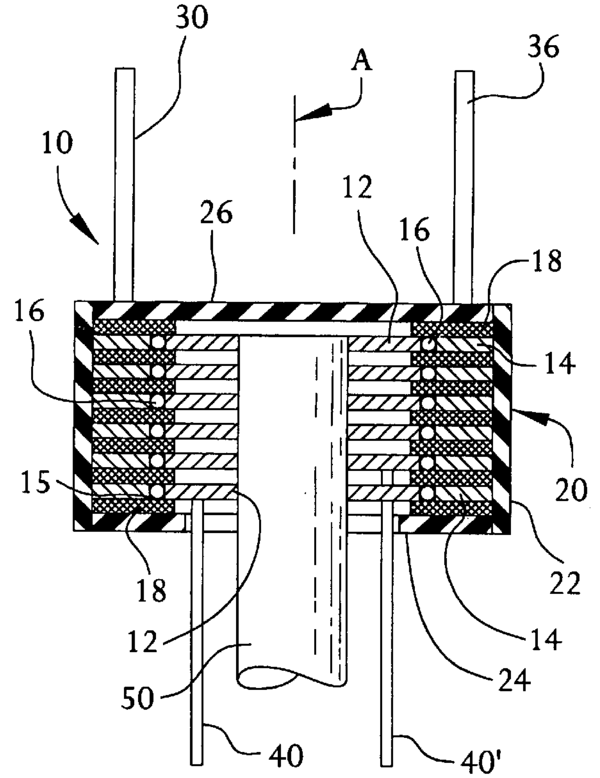
FIG. 2 is a longitudinal sectional view of the slip ring assembly depicted in FIG. 1.

The invention relates to brushless slip rings, preferably for use in transmitting electrical signals through a rotating interface.

The brushless slip ring 10 comprises stacks of ring elements arranged coaxially with respect to an axis A, which axis could be vertical or horizontal.

Each stack includes an annular space 15 defined between a rotor ring 12, a radially outwardly spaced stator ring 14, and a pair of axially spaced retainer rings 18. The rotor ring 12 and stator ring 14 are coplanar and formed of an electrically conductive material, such as brass or copper, which may be plated with a precious metal, preferably silver. Rolling elements in the form of equal-diameter spherical balls 16 (or cylinders) are disposed in the annular space 15. The balls are preferably formed of an electrically conductive material such as chrome, copper or brass which is plated with a precious metal, preferably gold. The materials selected for the rings 12, 14 and balls 16 are preferably such that the balls are harder than the rings. The balls are rigid in that they do not deform under the forces imposed thereon in the bushing.

The balls 16 and rings 12, 14 are designed to ensure that the balls will fit into the space 15 and yet be disposed so closely to one another and to the rings that an electrical path will always be established between the rings by way of the balls 16.

This is achieved by providing a large number of balls which are freely movable circumferentially relative to one another, i.e. the balls move relative to one another along the circumference of the annular space so that the balls can make electrically conductive contact with one another. Thus, the chances are greatly increased that, statistically speaking, at least one electrical path will always exist between the rings, even if no single one of the balls is in electrically conductive relationship with both rings. That is, if a ball which contacts only one ring is in electrically conductive relationship with a ball that contacts the other ring, an electrical current will be transmitted between the rings.

Figure 3:
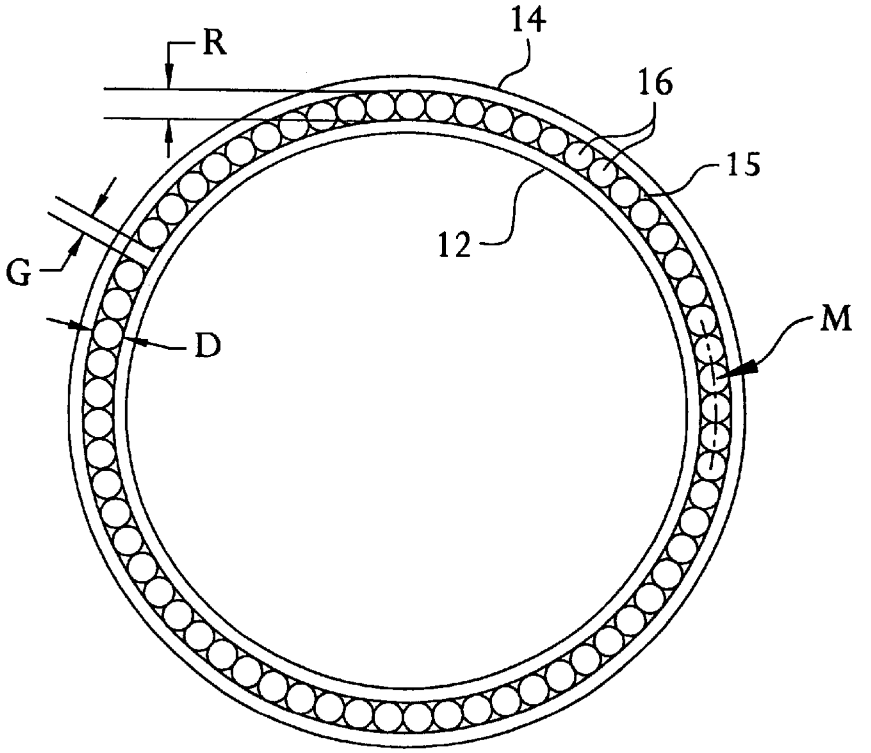
FIG. 3 is a schematic end view of the slip ring according to the invention.

Therefore, the balls are provided in a quantity sufficient to extending around substantially the entire circumference of the annular space. Preferably, with all balls touching one another, the remaining gap G shown in FIG. 3 is smaller than one ball diameter D. Stated another way, a total circumferential spacing between all rolling elements is no greater than a diameter of one of the rolling elements.

Figure 4:
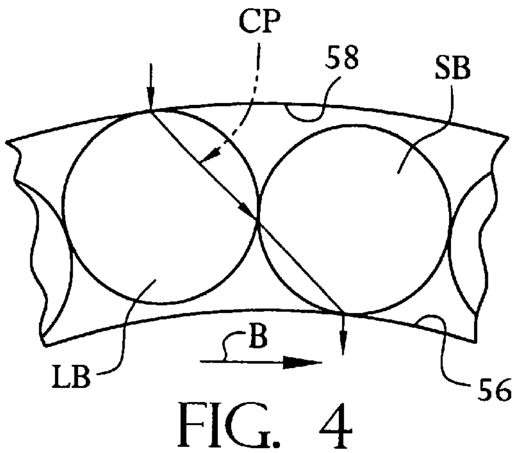
FIG. 4 is an enlarged view of the spacial relationship between rolling elements according to the invention.

As pointed out earlier herein, it is virtually impossible, due to normal manufacturing tolerances, to make the balls of exactly identical diameter. This makes it also impossible for all balls to simultaneously contact both rings. In fact, it is possible that none of the balls will do so. That fact, however, has been used to advantage in the present invention, as explained below in connection with FIG. 4 which depicts the rotary elements and conductive surfaces 56, 58 of the inner and outer rings, respectively, in a highly enlarged state. It is assumed that the operation of the apparatus causes the balls to roll along the angular space in direction B. Even though the difference in diameter between adjacent balls may be minute, the fact that a difference exists means that the center of gravity of the larger ball LB rolls along a path which is of larger diameter than a path about which the center of gravity of the smaller ball SB rolls. As a result, the larger ball tends to roll over the smaller ball. In so doing, the larger ball comes into contact with the outer conductive surface 58 and pushes the smaller ball against the inner conductive surface 56. Thus, there is established an electric current path CP extending from the surface 58 to the larger ball LB, then from the larger ball LB to the smaller ball SB, and then from the smaller ball SB to the surface 56. This path of travel involves only three interfaces (as compared with four interfaces existing in connection with caged rollers, as explained earlier herein), thereby minimizing the electrical resistance. Furthermore, those interfaces will be formed in response to the balls being forcefully displaced in the radial and circumferential directions, so the surfaces at the interfaces will be pressed relatively firmly together, thereby further minimizing electrical resistance.

Also, there will simultaneously exist many of the circuit paths CP around the circumference, so the total electrical resistance of the assembly 10 will be relatively low.

In one example of the invention, a ball diameter is selected so that a radial dimension R of the space 15, i.e., the radial distance between the inner surface of ring 14 and the outer surface of the ring 12 (see FIG. 3), is greater than the ball diameter by no more than about 0.020 inches, preferably by no more than about 0.01 inches, and most preferably no more than about 0.002 inches. Those numbers will differ slightly from ball to ball, since there exists a tolerance in the diameters of the balls. Also, the circumference of an imaginary circle M extending around the midpoint of the space 15 is greater than the total diameters of all balls by an amount no greater than the product of 0.01 inches multiplied by the total number of balls (preferably by no more than 0.005 inches times the number of balls, and most preferably by no more than 0.001 inches times the total number of balls). Stated another way, if all balls were equidistantly spaced from one another, the spacing between adjacent balls would be no greater than 0.01 inches (preferably no greater than 0.005 inches and most preferably 0.001 inches). Balls having a diameter of 1/16 inch diameter have been successfully used, as have balls of 1/32 inch diameter.

The retainer rings 18 are formed of any conventional electrically insulative, self-lubricating material.

The rings and balls are contained within a housing 20 formed by an electrically non-conductive cylinder 22 which is closed at its longitudinal ends by an electrically non-conductive end cap 24 and an electrically non-conductive cover 26, respectively.

At least one electrically insulative locking shaft 30 extends between the end cap and cover and passes through all of the stator rings 14 and retainer rings 18 to lock those rings in their relative positions. Likewise, at least one electrically insulative locking shaft 32 extends through all of the rotor rings 12 and is affixed to an end-most one of the rotor rings.

Each of the stator rings 14 is electrically connected to the end of a respective stator lead 36 (only one being depicted), which lead passes through a clearance hole 38 in other stator rings 14 through which it passes.

Likewise, each rotor ring 12 is electrically connected to the end of a respective rotor lead 40, 40', which lead passes through a clearance hole 42 in other rotor rings 12 through which it passes.

The rotor rings 12 are mounted on the rotor shaft 50 of an electric motor or generator for rotation therewith. An electrically insulative interface is provided between the shaft 50 and the rotor rings 12.

As the shaft 50 and rotor rings continually rotate during operation of the motor or generator, each annular row of balls 16 desirably rotates in contact with a surface 56 of a respective rotor ring 12, and a surface 58 of a respective stator ring 14. As observed earlier, it is unlikely that any of the balls actually makes simultaneous contact with both of the surfaces 56, 58. Rather, larger balls LB contact the outer surface 58, and push smaller balls against the inner surface 56. Consequently, the balls firmly contact the surfaces 56, 58 and firmly contact one another, to form many low-resistance circuit paths CP defined by three interfaces, as observed earlier. The presence of numerous circuit paths CP significantly reduces the overall electrical resistance of the slip ring.

Since the balls roll along the surfaces 56, 58, the friction therebetween is very low. Likewise, friction between the balls and the retainer rings 18 is very low because of the self-lubricating nature of the retainer rings. The balls and ring surfaces need not be lubricated, but if desired, a suitable lubricant can be disposed in the space to reduce friction and noise.

Figure 5:
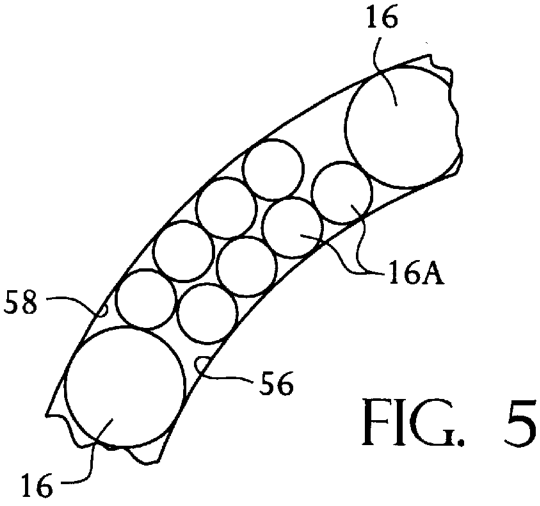
FIG. 5 is a fragmentary view taken in a direction parallel to an axis of rotation of a modified version of the invention.

In lieu of having the balls 16 directly contacting one another, they could be circumferentially spaced apart, with the spaces therebetween filled with smaller electrically conductive rigid balls 16A, as shown in FIG. 5. The smaller balls 16A will rotate against one another, against the surfaces 56, 58 of the rotor and stator rings, against the flat surfaces of the retainer rings 18, and against the larger balls 16.

The materials from which the rotor and stator rings 12, 14 and balls 16 are formed will be tailored to the specific performance parameters of a given slip ring. For example, a slip ring which requires low electrical noise at relatively low rotational speeds could employ precious metal alloys, such as those commonly used in conventional slip rings, for making the rings and balls. A slip ring which requires high rotational speeds and extensive life characteristics could employ balls and rings composed of precious metals or highly conductive materials such as copper and brass alloyed with harder, more structural materials for wearability.

Figure 6:
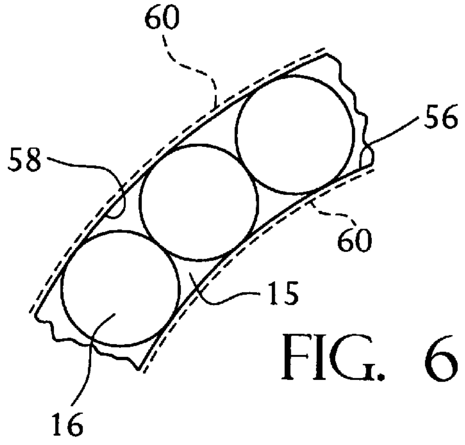
FIG. 6 is a view similar to FIG. 3 depicting a preferred manner of mounting rotary elements between two surfaces according to the invention.

One preferred way of assembling balls 16 into a respective annular space 15 will now be described. The rotor ring 12, stator ring 14, and one of the retainer rings 18 of that space are first assembled together, whereby the space is upwardly axially open. The balls 16 are then pushed downwardly (axially) into the annular space. The radial dimension of the annular space, i.e., the radial distance between the ring surfaces 56, 58, is slightly smaller than the ball diameter, and the balls are harder than the surfaces 56, 58, so the balls form small axial grooves in the surfaces as they are pushed in. Then, one of the surfaces 56 or 58 is rotated (e.g., by manual force) relative to the other, to cause the balls to roll, whereupon the balls perform a burnishing action to form circumferential grooves 60 in the respective surfaces 56, 58 (see FIG. 6). This mounting technique serves to minimize any radial gaps between the balls 16 and the surfaces 56, 58.

Figure 7:
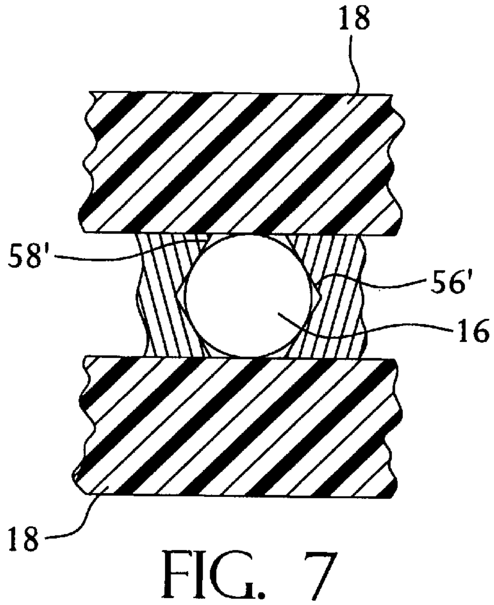
FIG. 7 is a fragmentary enlarged sectional view showing a modified shape of the two surfaces.

Alternatively, the ring surfaces 56', 58' could have a preformed V-shaped cross section as shown in FIG. 7, whereby each ball makes two-point contact with each of the ring surfaces.

In accordance with the present invention a brushless slip ring 10 is provided which exhibits a high degree of current-carrying capacity since the cageless balls are in electrically conductive relationship with each other.

The balls 16 are rigid (preferably more rigid than the ring surfaces). That rigidity, plus the fact that the balls are not biased by a high elastic force against the ring surfaces, means that the balls are highly wear resistant.

The rolling elements have been described as being spheres or balls, but could, if desired comprise cylindrical rollers.

The arrangement depicted in FIG. 1 is a so-called drum design wherein the annular spaces 15 are axially spaced apart. It will be appreciated that the invention is also applicable to a so-called platter design in which the spaces 15 are coplanar and radially spaced (i.e., a radially inner small-diameter space and a radially outer large-diameter space separated radially by an insulator, and with a row of conductive roller elements in each space).

Figure 8:
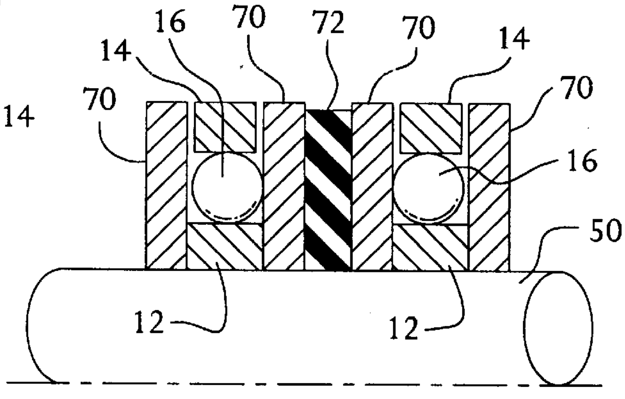
FIG. 8 is a longitudinal sectional view taken through a portion of a slip ring assembly according to another embodiment of the invention.

Depicted in FIG. 8 is another embodiment of the invention wherein the retainer rings 70 are formed of an electrically conductive material. The outer rings 14 are thinner than the inner rings 12 so that the retainer rings 70 contact the inner rings 12, but not the outer rings 14. (Alternatively, the reverse could be true, i.e., the inner rings 12 could be made thinner than the outer rings 14.) Upon making contact with one of the retainer rings 70, a ball 16 will be in electrically conductive relationship therewith, thereby increasing the potential contact area for transmitting electrical signals to the inner rings 12. Accordingly, the overall electrical resistance of the slip ring assembly is yet further reduced. In the event that plural sets of rings are employed, an electrically insulative ring 72 can be positioned between adjacent ones of the retainer rings 70.

The electrically conductive retainer rings 70 will also be more thermally conductive and thus can carry-off heat which is generated during operation of the slip ring assembly.

Figure 9:
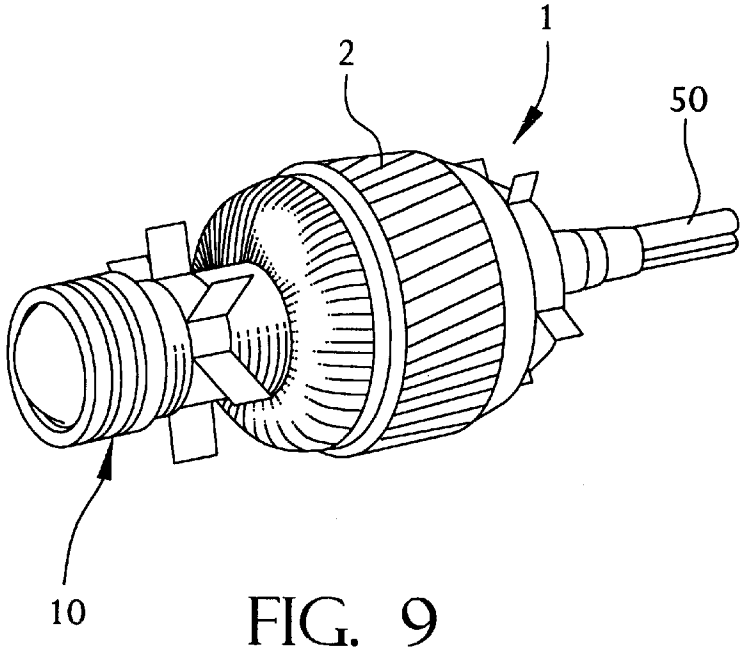
FIG. 9 is a perspective view of an electric motor employing a brushless slip ring according to the invention.

The invention is applicable to all types of machines in which electric current is to be conducted between relatively rotatable members, such as wound-rotor induction motors, synchronous motors and alternators, rotary converters, generators etc. An electric motor 1 employing a brushless slip ring assembly 10 according to the invention, is depicted in FIG. 9. The motor 1 includes a rotor shaft 50 mounted within a fixed stator assembly 2 which rotates the rotor shaft.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A brushless slip ring apparatus for use in a dynamically operating electrical machine, said brushless slip ring apparatus comprising:

a housing;

inner and outer members mounted in said housing for relative rotation about a longitudinal axis, said inner and outer members including respective radially spaced inner and outer electrically conductive surfaces forming an annular space therebetween, one of either the inner or outer members being continuously rotatable by means of a continuously operating power source and the other of either the inner or outer members being fixed against rotation; and a cageless assembly of electrically conductive rolling elements freely and continuously rotatably disposed in said space for contacting and conducting electrical current between said outer and inner surfaces, said rolling elements being rigid and arranged in annular row means for constant and continuous movement within the space at all times during operation of the machine, said rolling elements occupying a portion of a circumference of said space and being freely movable circumferentially relative to one another for making electrically conductive contact with one another and said outer and inner surfaces, the rolling elements being configured and sized within said space such that at all times during operation of the machine, the rolling elements are forcefully displaced in radial and circumferential directions within the space, said rolling elements are of such quantity that the total circumferential spacing between all of said rolling elements within the annular space is no greater than the diameter of one of said rolling elements, whereby the rolling elements being forcefully displaced in radial and circumferential directions in the space at all times create a multitude of established forced electrical circuit paths, each circuit path comprising a minimum of three forcibly created interface surfaces between a rolling element and the inner and outer members.

2. The brushless slip ring apparatus according to claim 1, further including a pair of axially spaced, electrically insulative retainer rings covering opposite axial sides of said space.

3. The brushless slip ring apparatus according to claim 2 wherein said retainer rings comprise a self-lubricating material.

4. The brushless slip ring according to claim 1, further including a pair of axially spaced electrically conductive retainer rings covering opposite sides of said space, said retainer rings being in electrically conductive contact with only one of said inner and outer members.

5. The brushless slip ring apparatus according to claim 1 wherein all of said rolling elements are of substantially equal diameter.

6. The brushless slip ring apparatus according to claim 1 wherein said rolling elements are harder than each of said inner and outer surfaces.

7. The brushless slip ring apparatus according to claim 1 wherein said rolling elements are of spherical shape.

8. A brushless slip ring apparatus according to claim 1 wherein a radial distance between said inner and outer surfaces being larger than said diameter of said rolling elements by an amount no greater than 0.02 inches.

9. A brushless slip ring apparatus according to claim 8 wherein an imaginary circle extending midway between said inner and outer surfaces coaxially with said surfaces having a circumference larger than the total diameters of all rolling elements by an amount no greater than a product of 0.01 inches multiplied by the total number of rolling elements.

10. The brushless slip ring apparatus according to claim 8 wherein said radial distance is larger than said diameter by an amount no greater than 0.005 inches.

11. The brushless slip ring apparatus according to claim 8 wherein said radial distance is larger than said diameter by an amount no greater than 0.002 inches.

12. The brushless slip ring apparatus according to claim 9 wherein said circumference of said imaginary circle is larger than said total diameters by an amount no greater than a product of 0.001 inches multiplied by the total number of rolling elements.

13. A brushless slip ring apparatus according to claim 1 wherein any two adjacent rolling elements form the path of electrical current between said outer and inner surfaces by means of a minimum of three contact interface surfaces.

14. The brushless slip ring apparatus according to claim 1 wherein said rolling elements are of varying diameter.

15. A brushless slip ring apparatus according to claim 1 wherein the annular row means comprises multiple annular rows of rolling elements.

16. A brushless slip ring apparatus according to claim 1 wherein the annular row means comprises one annular row of rolling elements.

17. A brushless slip ring apparatus according to claim 1 wherein a multitude of electrical current paths exist between the rolling elements and the outer and inner surfaces.

18. A brushless slip ring apparatus according to claim 1 wherein said rolling elements are of substantially equal diameter.

19. A brushless slip ring apparatus according to claim 1 wherein there is two point contact between each rolling element and the outer surface and two point contact between each rolling element and the inner surface.

20. A dynamically operating electronic machine including a power-driven rotor shaft and a brushless slip ring assembly, the brushless slip ring assembly comprising:

a plurality of rotor rings affixed to said rotor shaft and spaced apart along a longitudinal axis of said rotor shaft, each rotor ring including a radially outwardly facing, electrically conductive annular first surface and being continuously rotatable by means of a continuously operating power source;

a plurality of axially spaced stationary stator rings fixed against rotation, each stator ring including a radially inwardly facing, electrically conductive annular second surface facing a respective first surface, said second surfaces spaced radially outwardly from respective first surfaces to form respective annular spaces therebetween, each annular space extending circumferentially about a longitudinal axis;

a plurality of retainer rings axially separating adjacent said annular spaces, adjacent said stator rings, and adjacent said rotor rings from one another; and a plurality of cageless assemblies of electrically conductive rolling elements freely and continuously rotatably disposed in respective ones of said spaces for conducting electrical current between said first and second surfaces, said rolling elements being rigid and arranged in annular row means for constant and continuous movement within the spaces as all times during operation of the machine, said rolling elements occupying a portion of the circumference of each said space and being freely circumferentially movable relative to one another for making electrically conductive contact with one mother and said first and second surfaces, whereby at all times during operation of the machine, the rolling elements are forcefully displaced in radial and circumferential directions within the spaces and are axially restrained by said retainer rings, and are configured in the spaces so that at least one uninterrupted path of electrical current will always exist between the respective surfaces.

21. A machine including a power-driven rotor shaft and a brushless slip ring assembly according to claim 20 wherein said rolling elements are of such quantity that a total circumferential spacing between all of said rolling elements in each said space is no greater than the diameter of one of said rolling elements.

22. A dynamically operating electrical machine according to claim 20 wherein there is two point contact between each rolling element and each first surface and two point contact between each rolling element and each second surface.

23. A dynamically operating machine according to claim 20 wherein said rolling elements are of such quantity that a total circumferential spacing between all of said rolling elements within each annular space is no greater than the diameter of one of said rolling elements, whereby the rolling elements, being forcefully displaced in radial and circumferential directions in the annular spaces at all times create a multitude of established forces electrical circuit paths, each circuit path comprising a minimum of three forcibly created interface surfaces between a rolling element and each annular first and second surfaces.

* * * * *